(12) United States Patent
Poellmann et al.

(10) Patent No.: US 7,514,501 B2
(45) Date of Patent: Apr. 7, 2009

(54) COPOLYMERIZABLE POLYALKYLENE GLYCOL MACROMONOMERS, AND THE PREPARATION AND USE THEREOF

(75) Inventors: Klaus Poellmann, Burghausen (DE); Jutta Czernin, Burgkirchen (DE); Josef Kapfinger, Falkenberg (DE)

(73) Assignee: Clariant Produckte (Deutschland) GmbH, Sulzbach (DE)

( * ) Notice: Subject to any disclaimer, the term of this patent is extended or adjusted under 35 U.S.C. 154(b) by 427 days.

(21) Appl. No.: 11/100,687

(22) Filed: Apr. 7, 2005

(65) Prior Publication Data

US 2005/0228125 A1 Oct. 13, 2005

(30) Foreign Application Priority Data

Apr. 7, 2004 (DE) .................. 10 2004 017 097

(51) Int. Cl.
C08K 3/00 (2006.01)
C07C 229/00 (2006.01)
C08F 2/16 (2006.01)

(52) U.S. Cl. ........................................ 524/800; 560/19
(58) Field of Classification Search ................. 524/800; 560/19

See application file for complete search history.

(56) References Cited

U.S. PATENT DOCUMENTS

| | | | |
|---|---|---|---|
| 5,451,641 A | 9/1995 | Eisenhart | |
| 5,486,587 A | 1/1996 | Shay | |
| 6,827,759 B2 | 12/2004 | Zhang | |
| 7,232,478 B2 * | 6/2007 | Owei et al. ............... | 106/14.41 |
| 2002/0045689 A1 | 4/2002 | Henry | |
| 2002/0177673 A1 * | 11/2002 | Weaver et al. ............... | 525/445 |
| 2003/0232918 A1 | 12/2003 | Amick | |
| 2004/0077817 A1 * | 4/2004 | Wamprecht et al. ............ | 528/44 |
| 2004/0087688 A1 * | 5/2004 | Weaver et al. ............... | 523/508 |
| 2004/0102155 A1 * | 5/2004 | Bollmann et al. ............ | 521/155 |
| 2004/0146674 A1 * | 7/2004 | Howell et al. .............. | 428/35.7 |
| 2006/0205630 A1 * | 9/2006 | Blankenship et al. ....... | 510/475 |

FOREIGN PATENT DOCUMENTS

JP 2000212154 A * 8/2000

OTHER PUBLICATIONS

Bruno Vollmert, "Grundriss der Makromolekularen Cheme—Outline of Macromolecular Chemistry", vol. 1, p. 55 (1980).

* cited by examiner

Primary Examiner—Mark Eashoo
Assistant Examiner—Noah Frank
(74) Attorney, Agent, or Firm—Richard P. Silver

(57) ABSTRACT

The present invention relates to the preparation of Ω-(dimethylisopropenylbenzylurethane) polyalkylene glycols with α-alkoxy or α-dihydroxy groups and to the use thereof as hydrolysis-stable macromonomers for the dispersion and crosslinking of polymers

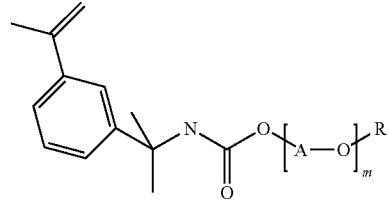
(1)

in which
A is $C_2$-$C_4$-alkylene
m is an integer from 5 to 900, and
R is $C_1$-$C_{20}$-alkyl, $C_6$-$C_{18}$-aryl or a radical according to formula 2a, 2b, 2c, 3a, 3b or 3c

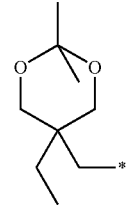
(2a)

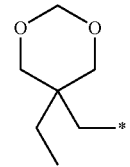

(2b)

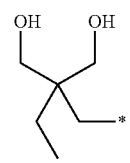

(2c)

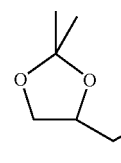

(3a)

(3b)

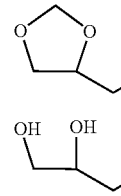

(3c)

which is bonded to the terminal oxygen atom of the alkoxy group (A-O) in formula 1 via the valence denoted by *, and in which A is not exclusively $C_3$- or $C_4$-alkylene.

11 Claims, No Drawings

COPOLYMERIZABLE POLYALKYLENE GLYCOL MACROMONOMERS, AND THE PREPARATION AND USE THEREOF

The present invention relates to the preparation of Ω-(dimethylisopropenylbenzylurethane) polyalkylene glycols with α-alkoxy or α-dihydroxy groups and to the use thereof as hydrolysis-stable macromonomers for dispersing and crosslinking polymers.

Polyalkylene glycols are generally prepared by anionic, ring-opening polymerization of epoxides (ethylene oxide, propylene oxide, butylene oxide) with alcohols as initiators according to the following reaction equation (see Ullmann Encyclopedia of Industrial Chemistry 5. ed VCH, ISBN 3-527-20100-9). If R'—OH=methanol, then α-methoxy-Ω-hydroxypolyalkylene glycols are formed

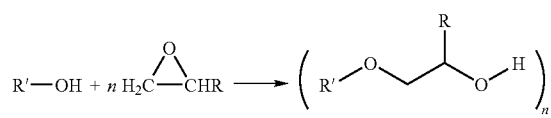

Polyalkylene glycol macromonomers are those polyalkylene glycols which contain a reactive, copolymerizable end double bond in addition to the polyether chain. They are of interest for the preparation of so-called comb polymers with polyalkylene glycol side groups for a large number of applications. To prepare these polyalkylene glycol macromonomers with end double bond, according to WO 00/012577, α-alkoxy-Ω-hydroxypolyalkylene glycols are converted, by esterification with acrylic acid, methacrylic acid or other unsaturated carboxylic acids, into the corresponding α-alkoxypolyalkylene glycol ester, which can then be copolymerized with other monomers.

A disadvantage here is the fact that both the α-alkoxypolyalkylene glycol ester macromonomer and also the comb polymer resulting during a copolymerization of such compounds have a tendency to hydrolyze the ester and thus to cleave off the α-alkoxypolyalkylene glycol side group during storage. Moreover, the α-alkoxypolyalkylene glycol esters of the acrylic and methacrylic acid have a tendency to homopolymerize, which makes the preparation and storage of the esters difficult and possible only in the presence of polymerization inhibitors.

Free-radically copolymerizable polyalkylene glycol macromonomers are also of great interest for the preparation and the subsequent crosslinking of aqueous polyurethane dispersions. For this application, however, the polyalkylene glycol macromonomers must contain, in addition to the free-radically copolymerizable, unsaturated group, at least one free hydroxyl or primary amino group which permits incorporation into the polyurethane dispersion.

It was therefore an object of the present invention to provide a free-radically copolymerizable polyalkylene glycol macromonomer which is significantly more hydrolysis-stable than α-alkoxypolyalkylene glycol esters of unsaturated carboxylic acids, has sufficiently good copolymerization properties and, if required, can be incorporated into an addition polymer, such as, for example, polyurethane, before the free-radical copolymerization.

The invention thus provides compounds of the formula 1

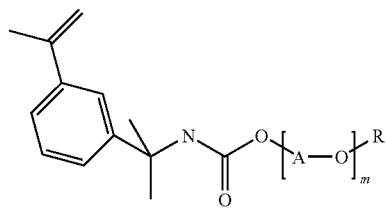

(1)

in which
A is $C_2$-$C_4$-alkylene
m is an integer from 5 to 900, and
R is $C_1$-$C_{20}$-alkyl, $C_6$-$C_{18}$-aryl or a radical according to formula 2a, 2b, 2c, 3a, 3b or 3c

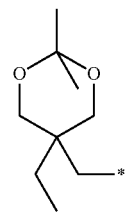

(2a)

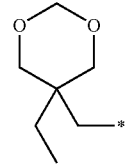

(2b)

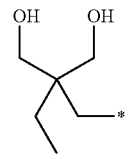

(2c)

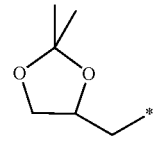

(3a)

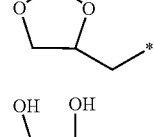

(3b)

(3c)

which is bonded to the terminal oxygen atom of the alkoxy group (A-O) in formula 1 via the valence denoted by *, and in which A is not exclusively $C_3$- or $C_4$-alkylene.

The invention further provides aqueous dispersions preparable by the free-radical polymerization of an olefinically unsaturated compound in the presence of a compound of the formula 1 by mixing the olefinically unsaturated compound in water with the compound of the formula 1, and triggering the polymerization by adding a free-radical initiator.

The invention further provides for the use of compounds of the formula 1 for preparing aqueous polymer dispersions by free-radically polymerizing olefinically unsaturated compounds in water with compounds of the formula 1. In the same way, the compounds of the formula 1 can be used for the emulsion stabilization in emulsion and suspension polymerizations. Particular preference is given to the use of compounds of the formula 1 for the preparation of polyurethane dispersions.

In the alkoxy chain represented by $(A-O)_m$, the total number of alkoxy units is preferably between 5 and 300, in particular between 8 and 300. The alkoxy chain may be a homopolymer or block polymer chain which has alternating blocks of different alkoxy units. It may also be a chain with a random sequence of the alkoxy units. The alkoxy units are preferably either only ethoxy units or a mixture of ethoxy and propoxy units.

In a preferred embodiment, $-(A-O)_m-R$ is an alkoxy chain of the formula

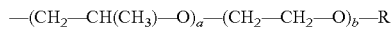

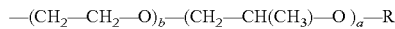

in which
a is a number from 0 to 300, preferably 0 to 80
b is a number from 5 to 300, preferably 5 to 200.

In a further preferred embodiment, $-(A-O)_m-$ is an ethoxy radical with 8 to 300 ethoxy units.

In a further preferred embodiment, R is a glycerol ketal or trimethylolpropane ketal/acetal group of the formulae 2a, 2b, 3a or 3b.

A common aspect of all of the embodiments is that preferably at least 50 mol % of the radicals (A-O) are ethoxy radicals, in particular 60 to 100 mol % are ethoxy radicals.

Preferred subject matters of the invention are the compounds of the formulae 4 and 5 which arise from the compounds of the formula 1 with the radicals R according to formula 2a, 2b and 3a, 3b by hydrolytic cleavage of the ketal or acetal group. The symbols A and m have the same meaning as in formula 1.

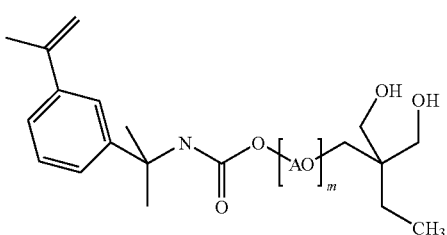

(4)

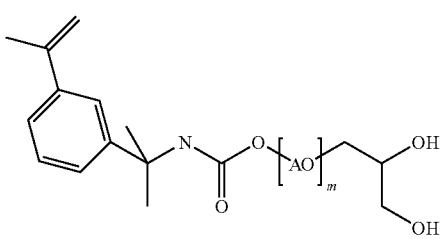

(5)

The compounds of the formulae 1, 4 and 5 are also referred to below as polymerizable macromonomers.

The process for the preparation of the polymerizable macromonomers and exemplary applications of the dispersions according to the invention are described in more detail below and illustrated by reference to examples.

The polymerizable macromonomers are prepared from Ω-monohydroxy-functional polyalkylene glycols which contain an alkoxy or glyceryl ketal/acetal or trimethylpropane ketal/acetal group in the α position by stoichiometric reaction with α,α-dimethyl meta-isopropenylbenzylisocyanate (formula 6) in the presence of catalysts known in the art for the formation of urethane. In the case of the diol-functional macromonomers according to formula 4 and 5, the step of urethane formation is additionally followed by hydrolytic cleavage of the ketal/acetal group from the α-position glyceryl ketal/acetal or trimethylolpropane ketal/acetal group without the urethane bond being cleaved in the process.

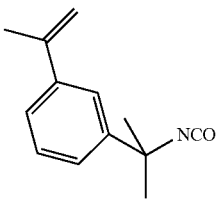

(6)

The degree of solubility in water, defined by the cloud point, of the polymerizable macromonomers, and the degree of their hydrophilizing and dispersing effect can be adjusted through the ratio and number of alkylene oxide units, preferably of ethylene oxide to propylene oxide.

The macromonomers according to the invention are themselves not homopolymerizable since the Ω-position α-methylstyryl group, in contrast to acrylic or methacrylic ester groups, is not able to homopolymerize (cf. B. Vollmert, Grundriss der Makromolekularen Chemie [Outline of macromolecular chemistry] volume I p. 55). The macromonomers according to the invention are thus storage-stable.

The free-radically initiated copolymerization of the polymerizable macromonomers with olefinically unsaturated comonomers produces the copolymer dispersions according to the invention. Suitable monomers which can be polymerized with the macromonomers are, for example, the following:

vinyl monomers, such as carboxylic esters of vinyl alcohol, for
example vinyl acetate, vinyl propionate, vinyl ethers of isononanoic acid or of isodecanoic acid, styrene and stilbene, olefinically unsaturated carboxylic esters, such as ethyl acrylate, n-butyl acrylate, isobutyl acrylate, hexyl acrylate, 2-ethylhexyl acrylate, hydroxyethyl acrylate, and the corresponding methacrylic esters, olefinically unsaturated carboxylic acids, such as acrylic acid, methacrylic acid and itaconic acid and their sodium, potassium and ammonium salts, olefinically unsaturated sulfonic acids and phosphonic acids and their alkali metal and ammonium salts, such as acrylamidomethylpropanesulfonic acid and its alkali metal and ammonium, alkylammonium and hydroxyalkylammonium salts, allylsulfonic acid and its alkali metal and ammonium salts, acryloyloxyethylphosphonic acid and its ammonium and alkali metal salts, and the corresponding methacrylic acid derivatives, olefinically unsaturated amines, ammonium salts, nitriles and amides, such as dimethylaminoethyl acrylate, acryloyloxyethyl-trimethylammonium halides, acrylonitrile, N-methacrylamide, N-ethylacrylamide, N-propylacrylamide, and the corresponding methacrylic acid derivatives and vinylmethylacetamide, olefins, such as ethylene, propylene and butene, pentene, 1,3-butadiene and chloroprene, vinyl halides, such as vinyl chloride, vinylidene chloride and vinylidene fluoride.

In the case of the diol-functional macromonomers according to formula 4 and 5, this described copolymerization can also take place only after the incorporation of the macromonomers into a polyurethane by polycondensation of the macromonomers according to formula 4 and 5 with isocyanates, such as, for example, toluene diisocyanate, and, if appropriate, other polyols customarily used in the preparation of polyurethane.

The present invention further relates to the use of the above-defined macromonomers of the formulae 1, 4 and 5 for stabilizing polymer dispersions.

The compounds of the formulae 1, 4 and 5 are used for this purpose on their own in suspension or emulsion polymerizations or in the preparation of aqueous polyurethane dispersions as emulsifiers, or they are used in a mixture with anionic and/or nonionic surfactants which are known in the prior art.

Customary anionic surfactants are sodium alkylsulfate, sodium dodecylbenzenesulfonate, sodium alkylsulfonate, sodium and ammonium alkylpolyethylene glycol ether sulfates, sodium and ammonium alkylphenol polyethylene glycol ether sulfates, and alkylpolyethylene glycol ether phosphoric mono-, di- and triesters and mixtures thereof and alkylphenol polyethylene glycol ether phosphoric mono-, di- and triesters and mixtures thereof.

The macromonomers according to the invention are largely hydrolysis-stable since the copolymerizable α-methylstyryl group is bonded to the polyalkoxy chain via a urethane bond, in contrast to macromonomers based on acrylic acid and methacrylic acid, both before and also after copolymerization with the other described comonomers. On the one hand, this permits the storage of the macromonomers according to the invention in aqueous solution, and on the other hand the polymer dispersions prepared from the macromonomers according to the invention are stable even in the presence of water at elevated temperatures and do not cleave off the polyalkoxy side chains.

The following examples illustrate the invention in more detail.

EXAMPLE 1

250 g of a commercially available α-methoxy-Ω-hydroxypolyethylene glycol with a molar mass of 500 g/mol (hydroxyl number 113 mg of KOH/g) are dried for 1 hour under reduced pressure at 80° C. Then, under nitrogen, 0.25 g of tin dilaurate and 100.6 g of α,α-dimethyl meta-isopropenylbenzylisocyanate were added and the mixture was stirred for 5 hours at a temperature of 120° C. After cooling to 80° C., 7 g of water were added and the mixture was stirred for a further hour. The sample was then dried under reduced pressure on a rotary evaporator. The hydroxyl number determined in accordance with DIN 53240 returned after the reaction to 2.3 mg of KOH/g. The iodine number in accordance with Kaufmann (method DGF C-V11 b) was 34.1 g of iodine/100 g. The ratio of the H atoms was investigated by means of $^1$H NMR. The sample was tested again after storage for 8 weeks at 70° C. without the addition of a stabilizer. Neither polymerization nor hydrolysis of the macromonomer was found.

The ratios of the functional groups before and after storage, determined by means of $^1$H NMR, are given in table 1:

| | Functional groups | | | | |
|---|---|---|---|---|---|
| | CH$_3$—O— | Vinylic H atoms | OCH$_2$CH$_2$O | Phenyl H atoms | CH$_2$O—CO—NH |
| Ratio of the $^1$H signals | 3.0 | 2 | 44 | 4.0 | 2.0 |
| Ratio of the $^1$H signals (after 8 weeks at 70° C.) | 3.1 | 2 | 44.9 | 4.0 | 1.98 |

EXAMPLE 2

The procedure is as in example 1 with the exception that instead of the α-methoxy-Ω-hydroxypolyethylene glycol, an α-dodecyl-Ω-hydroxypolyethylene glycol (dodecyl alcohol ethoxylate) with a molar mass of 510 g/mol (hydroxyl number 110 mg of KOH/g) was used. The hydroxyl number returned to 2 mg of KOH/g as a result of the reaction. The sample was investigated by means of $^1$H NMR. The sample was tested again after storage for 8 weeks at 70° C. without the addition of a stabilizer. Neither polymerization nor hydrolysis of the macromonomer was found. The ratios of the functional groups, determined by means of $^1$H NMR, are given in table 2:

|  | Functional groups | | | | |
|---|---|---|---|---|---|
|  | $CH_3(CH_2)_{11}$—O— | Vinylic H atoms | $OCH_2CH_2O$ | Phenyl H atoms | $CH_2O$—CO—NH |
| Ratio of the $^1$H signals | 24 | 2 | 28 | 4.0 | 2.0 |
| Ratio of the $^1$H signals (after 8 weeks at 70° C.) | 24.5 | 2 | 29 | 4.0 | 1.96 |

EXAMPLE 3

The procedure is as in example 1 with the exception that instead of commercially available α-methoxy-Ω-hydroxy-polyethylene glycol with molar mass 500 g/mol, 287.6 g of a commercially available α-methoxy-Ω-hydroxypolyethylene glycol with molar mass 4796 g/mol (hydroxyl number 11.7 mg of KOH/g) were now used, and that the amount of α,α-dimethyl meta-isopropenylbenzylisocyanate was reduced to 12.1 g in order to use equimolar amounts. The sample was analyzed by means of $^1$H NMR. The hydroxyl number was 1.5 mg of KOH/g after the reaction. The iodine number was 5.3 g of iodine/100 g.

The sample was tested again after storage for 8 weeks at 70° C. without the addition of a stabilizer. Neither polymerization nor hydrolysis of the macromonomer was found.

The ratios of the functional groups before and after storage, determined by means of $^1$H NMR, are given in table 3:

|  | Functional groups | | | | |
|---|---|---|---|---|---|
|  | $CH_3$—O— | Vinylic H atoms | $OCH_2CH_2O$ | Phenyl H atoms | $CH_2O$—CO—NH |
| Ratio of the $^1$H signals | 3.0 | 2.2 | 452 | 4.3 | 2.2 |
| Ratio of the $^1$H signals (after 8 weeks at 70° C.) | 3.1 | 2.1 | 462 | 4.3 | 2.1 |

EXAMPLE 4

The procedure is as in example 1 with the exception that instead of the commercially available α-methoxy-Ω-hydroxypolyethylene glycol with molar mass 500 g/mol, 279.1 g of an α-methoxy-Ω-hydroxypolypropylene glycol-polyethylene glycol block copolymer with molar mass 1396 g/mol (hydroxyl number 40.2 mg of KOH/g) and the following structure

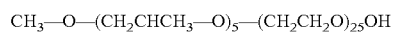

$$CH_3—O—(CH_2CHCH_3—O)_5—(CH_2CH_2O)_{25}OH$$

was now used, and that the amount of α,α-dimethyl meta-isopropenyl-benzyl isocyanate was adapted to 40.24 g in order to use equimolar amounts. The sample was analyzed by means of $^1$H NMR. The hydroxyl number was 1.9 mg of KOH/g after the reaction, the iodine number was 14.8 g of iodine/100 g. This corresponds to a molar mass of 1709 g/mol per double bond. The product has a cloud point in water of 28° C.

The sample was tested again after storage for 8 weeks at 70° C. without the addition of a stabilizer. Neither polymerization nor hydrolysis of the macromonomer was found.

The ratios of the functional groups before and after storage, determined by means of $^1$H NMR, are given in table 4:

|  | Functional groups | | | | |
|---|---|---|---|---|---|
|  | Vinylic H atoms | $OCH_2CHCH_3O$ | $OCH_2CH_2O$ | Phenyl H atoms | $CH_2O-CO-NH$ |
| Ratio of the $^1$H signals*) | 2.0 | 15 | 104 | 4.0 | 2.0 |
| Ratio of the $^1$H signals (after 8 weeks at 70° C.) | 1.9 | 15.4 | 106 | 4.1 | 2.0 |

*)This corresponds to a molar mass of 1635 g/mol and is in good agreement with the value to be expected in theory (1600 g/mol) and the value ascertained by means of the iodine number (1709 g/mol).

EXAMPLE 5

The procedure is as in example 1 with the exception that instead of the commercially available α-methoxy-Ω-hydroxypolyethylene glycol with molar mass 500 g/mol, 336.25 g of an α-(1,2-O-isopropylidene glycerol)-Ω-hydroxypolyethylene glycol with a molar mass of 1345 g/mol (hydroxyl number 41.7 mg of KOH/g) and the following structure

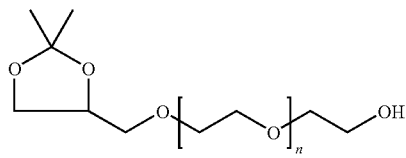

where n=27 were now used, and that the amount of α,α-dimethyl meta-isopropenylbenzyl isocyanate was adapted to 50.25 g in order to use equimolar amounts. The sample was analyzed by means of $^1$H NMR. The hydroxyl number was 2.1 mg of KOH/g after the reaction.

The sample was tested again after storage for 8 weeks at 70° C. without the addition of a stabilizer. Neither polymerization nor hydrolysis of the macromonomer was found.

The ratios of the functional groups before and after storage, determined by means of $^1$H NMR, are given in table 5:

EXAMPLE 6

Cleavage of the Ketal:

100 g of the reaction product from example 6 were dissolved with 35 g of water and 2 g of phosphoric acid and stirred at 80° C. for two hours. The mixture was then dewatered under reduced pressure, and the product was neutralized to pH 6-7 with dilute sodium hydroxide solution, dewatered again under reduced pressure and filtered.

The resulting product had an OH number of 86 mg of KOH/g and an iodine number of 17.4 g of iodine/100 g in agreement with the following structure:

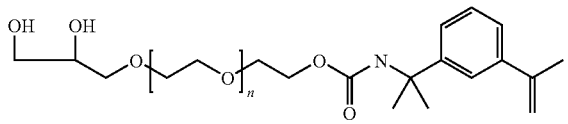

where n=23.

|  | Functional groups | | | | |
|---|---|---|---|---|---|
|  | Vinylic H atoms | Isopropylidene $CH_3$ | $OCH_2CH_2O$ | Phenyl H atoms | $CH_2O-CO-NH$ |
| Ratio of the $^1$H signals | 2.0 | 6.1 | 112 | 4.1 | 2.1 |
| Ratio of the $^1$H signals (after 8 weeks at 70° C.) | 1.9 | 6.0 | 110 | 4.1 | 2.0 |

The invention claimed is:

1. A compound of the formula 1

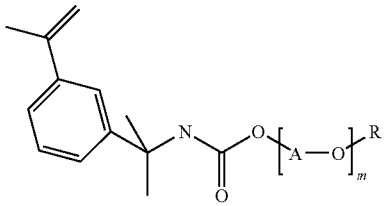
(1)

in which
A is $C_2$-$C_4$-alkylene
m is an integer from 5 to 900, and
R is a radical according to formula 2a, 2b, 2c, 3a, 3b or 3c

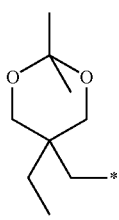
(2a)

(2b)

(2c)

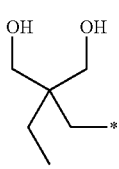
(3a)

(3b)

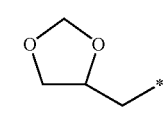
(3c)

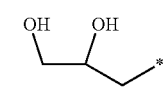

which is bonded to the terminal oxygen atom of the alkoxy group (A-O) in formula 1 via the valence denoted by *, and in which A is not exclusively $C_3$- or $C_4$-alkylene.

2. A compound of the formula 4

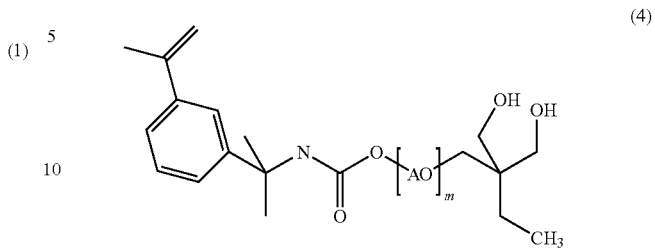
(4)

in which A is a $C_2$-$C_4$-alkylene group and m is an integer from 5 to 900, with the proviso that A is not exclusively $C_3$- or $C_4$-alkylene.

3. A compound of the formula 5

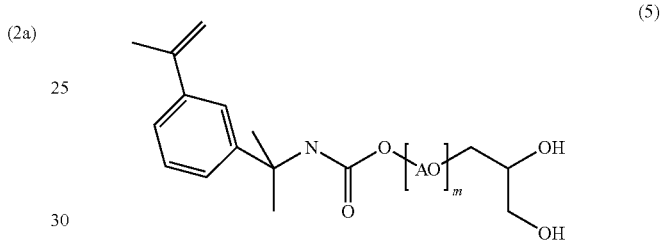
(5)

in which A is a $C_2$-$C_4$-alkylene group and m is an integer from 5 to 900, with the proviso that A is not exclusively $C_3$- or $C_4$-alkylene.

4. The compound of claim 1, in which at least 50 mol % of the units -(A-O)$_m$- are ethoxy units.

5. An aqueous dispersion prepared by a process of free-radical polymerization of an olefinically unsaturated compound in the presence of a macromonomer compound selected from the group consisting of the formula 1, 4, 5, and mixtures thereof

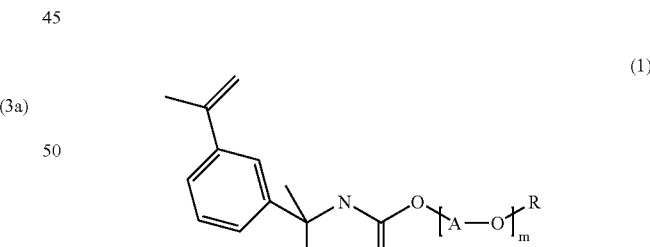
(1)

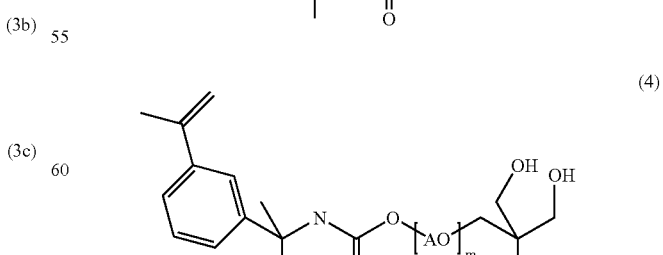
(4)

-continued (5)

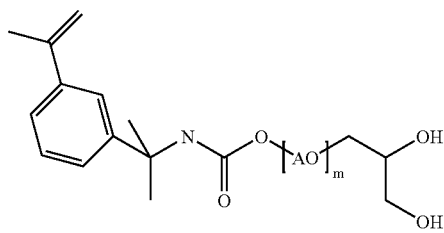

wherein A is $C_2$-$C_4$-alkylene
m is an integer from 5 to 900, and
R is a radical according to formula 2a, 2b, 2c, 3a, 3b or 3c (2a)

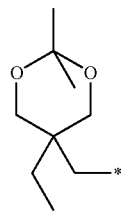

(2b)

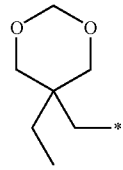

(2c)

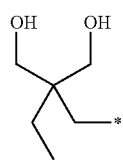

(3a)

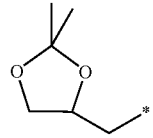

(3b)

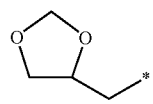

-continued (3c)

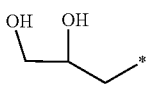

which is bonded to the terminal oxygen atom of the alkoxy group (A-O) in formula 1 via the valence denoted by *, and in which A is not exclusively $C_3$- or $C_4$-alkylene, said process comprising mixing the olefinically unsaturated compound in water with the macromonomer compound selected from the group consisting of the formula 1, 4, 5 and mixtures thereof, and triggering the polymerization by adding a free-radical initiator.

6. The aqueous dispersion as claimed in claim 5 wherein the macromonomer compound according to formula 1, 4 or 5 has a cloud point in water of at least 20° C.

7. The aqueous dispersion of claim 5, in which R is a ketal of glycerol or trimethylolpropane.

8. The aqueous dispersion of claim 5, in which R is

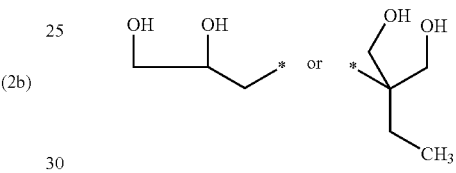

and the bond to the alkoxy group (A-O) in formula 1, 4 or 5 takes place via the valence denoted by *.

9. The aqueous dispersion of claim 5, in which $-(A-O)_m-$ is a mixed alkoxy group with at least 50 mol % of ethoxy groups.

10. The aqueous dispersion of claim 5, in which $-(A-O)_m-$ is an alkylene oxide block polymer of the formula

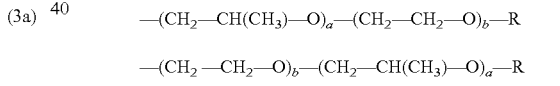

in which
a is a number from 0 to 300, preferably 0 to 80
b is a number from 5 to 300, preferably 5 to 200.

11. The aqueous dispersion of claim 5, in which $-(A-O)_m-$ is an ethoxy chain with 8 to 240 ethoxy units.

* * * * *

UNITED STATES PATENT AND TRADEMARK OFFICE
CERTIFICATE OF CORRECTION

PATENT NO. : 7,514,501 B2  
APPLICATION NO. : 11/100687  
DATED : April 7, 2009  
INVENTOR(S) : Klaus Poellmann, Jutta Czernin and Josef Kapfinger It is certified that error appears in the above-identified patent and that said Letters Patent is hereby corrected as shown below:

On the title page item (73), should read: Clariant Produkte (Deutschland) GmbH, Sulzbach (DE)

Signed and Sealed this

Twenty-third Day of June, 2009

JOHN DOLL  
*Acting Director of the United States Patent and Trademark Office*